United States Patent [19]
Sartorio

[11] 3,785,743
[45] Jan. 15, 1974

[54] STRUCTURE FOR MEASURING MACHINES, MACHINE TOOLS AND THE LIKE IMMUNE FROM THE INFLUENCE OF VARIABLE, FIXED OR MOBILE LOADS ACTING ON IT, INCLUDING THE WEIGHT OF THE WORKPIECES AND FROM THE INFLUENCE OF THE GROUND TO WHICH IT IS CONNECTED

[75] Inventor: Franco Sartorio, Moncalieri, Italy
[73] Assignee: D.E.A. Digital Electronic Automation S.p.A., Moncalieri, Italy
[22] Filed: May 12, 1972
[21] Appl. No.: 252,685

[52] U.S. Cl. .............................. 408/143, 100/214
[51] Int. Cl. ............................................ B23b 47/00
[58] Field of Search ....................... 408/234, 143; 100/214; 53/166 R; 248/20, 358 AA

[56] References Cited
UNITED STATES PATENTS
| | | | |
|---|---|---|---|
| 3,441,238 | 4/1969 | Flannelly | 248/20 |
| 3,393,555 | 7/1968 | Flannelly | 248/20 X |
| 2,998,867 | 9/1961 | Dall | 248/20 X |
| 3,394,710 | 3/1968 | Sattler | 408/143 |
| 2,751,822 | 6/1950 | Schlitz | 408/143 X |

Primary Examiner—Andrew R. Juhasz
Assistant Examiner—Leon Gilden
Attorney—S. Delvalle Goldsmith et al.

[57] ABSTRACT

A structure for measuring mechines or machine tools adapted for resting on the ground by way of three columns and comprising at least one worktable adapted to support a workpiece to be machined or measured and saddles mobile with respect to said worktable is described. The structure includes a supporting substructure to which the worktable is fixed, a working substructure on which the saddles are mobile and a force substructure connected by three rigid supports to the ground. The supporting substructure is connected by three resilient supports to the ground, the working substructure restes by means of three further rigid supports on the supporting substructure and the saddles are resiliently supported by the force substructure.

13 Claims, 3 Drawing Figures

STRUCTURE FOR MEASURING MACHINES, MACHINE TOOLS AND THE LIKE IMMUNE FROM THE INFLUENCE OF VARIABLE, FIXED OR MOBILE LOADS ACTING ON IT, INCLUDING THE WEIGHT OF THE WORKPIECES AND FROM THE INFLUENCE OF THE GROUND TO WHICH IT IS CONNECTED

BACKGROUND OF THE INVENTION

In machine tools and measuring machines, characterised by a high level of precision, not only the rigidity of the machine structure is extremely important, but also the connection of said structure to the foundations.

In fact, examining only one of the aspects which influence the precision of a machine, i.e., its rigidity, the factors which contribute towards generating errors may be of two types: factors external to the machine and factors internal to it. External factors comprise vibrations and settling of the ground to which the machine is connected, whereas internal factors comprise the mobile loads of the machine constituted by the saddles or carriages, and the variable loads — fixed or mobile — constituted by the workpieces to be measured or machined and the cutting forces in the machine tools.

The effect of these factors is usually reduced either by seeking to make machines very rigid and hence relatively heavy, or by employing large concrete blocks for the structure foundations, which may also be supported by resiliently supports for filtering the vibrations in the surrounding ground.

This system, although valid, has many disadvantages. For example, to mention a few, it increases the cost of the machine, it compels the machine to be installed at ground level and is not immune from the influence of the variable loads on the settling of the structure or from the influence of the settling of the machine supports on the foundations.

In high precision machines, such as vertical spindle boring machines, this latter disadvantage (settling of the supports) has been eliminated by resorting to support at three points, i.e., reducing the structure to an isostatic system and hence uninfluenced by the settling of its supports.

This solution increases the weight and hence the cost of the machine because, especially if the machine is of large dimensions, the supports are necessarily distant one from the other and the baseplate or bed of the machine must be very rigid so that no deflection incompatible with the level of precision required arises between one support and another.

SUMMARY OF THE INVENTION

The object of the present invention is a structure for measuring machines or machine tools which allows the aforementioned disadvantages to be eliminated.

The structure according to the invention adapted for resting on the ground by way of three columns, comprises at least one worktable adapted to support a workpiece to be machined or measured and saddles mobile with respect to said worktable, of which at least one is adapted to allow an element or holder supporting a tool or tracer point to slide, a supporting substructure to which said worktable is fixed, a working substructure on which said saddles are mobile and a force substructure connected by three rigid supports to said ground, said supporting substructure being connected by three resilient supports to said ground, said working substructure resting by means of three further rigid supports on said supporting substructure and said saddles being resiliently supported by said force substructure.

The structure according to the invention eliminates all the aforementioned disadvantages as it is essentially based on the principle of being constituted by independent substructures each of which performs a single function. In it, in fact, the supporting substructure supports the weight of the workpiece, the working substructure constitutes the actual machine, its function being to guide the measuring or working tool over its trajectory, and the force substructure supports the mobile loads or saddles of the machine.

The working substructure of the machine rests rigidly at three points on the supporting structure, which in its turn is connected by three resilient supports to the ground.

Consequently the settling and vibrations of the ground have no influence on the machine and yielding of the supporting substructure has no influence on the working substructure. Once the workpiece has been positioned on the supporting substructure, it remains fixed during the whole of the time in which the machine is operating.

The mobile loads or saddles of the machine are connected resiliently to the force substructure which is connected in its turn to the ground.

In the case of measuring and scribing machines, it can be said that with a configuration of this kind the working substructure of the machine is not subjected to any force, or at least only to a small force determined at will, and consequently may be dimensioned sufficiently rigidly for obtaining high precision without having to resort to enormous structures. Moreover, it is not necessary for the supporting substructure or force substructure to be rigid, because it is virtually only necessary for them to support the loads applied to them without exceeding the elastic limit, as their yielding does not influence the precision of the machine.

In the case of machine tools the only force in play which remains is the cutting force, which may in its turn be considerable. Again in this case such a configuration is always advantageous because those parts of the machine subjected to this force, i.e., the working substructure and supporting substructure, need to be dimensioned such that their rigidity is sufficient to resist this force, but not the weight of the workpiece and the mobile loads.

In each case when the workpiece is positioned on the supporting substructure it must be aligned with the working substructure.

With regard to the force substructure which supports the mobile loads or saddles of the machine, its yielding is absorbed by the resilient elements which connect it to said carriages or saddles. In fact, the elastic constant of the resilient elements is as small as possible, so that the variation of force on the working substructure which is manifested through yielding of the force substructure following the movement of the loads, may be as small as desired (the operating principle of this latter device is described in the Italian Patent No. 764361).

BRIEF DESCRIPTION OF THE DRAWINGS

For a better understanding of the present invention, a description is hereinafter given by way of example of one embodiment, with reference to the accompanying drawings in which.

DETAILED DESCRIPTION OF THE INVENTION

Figure 1:
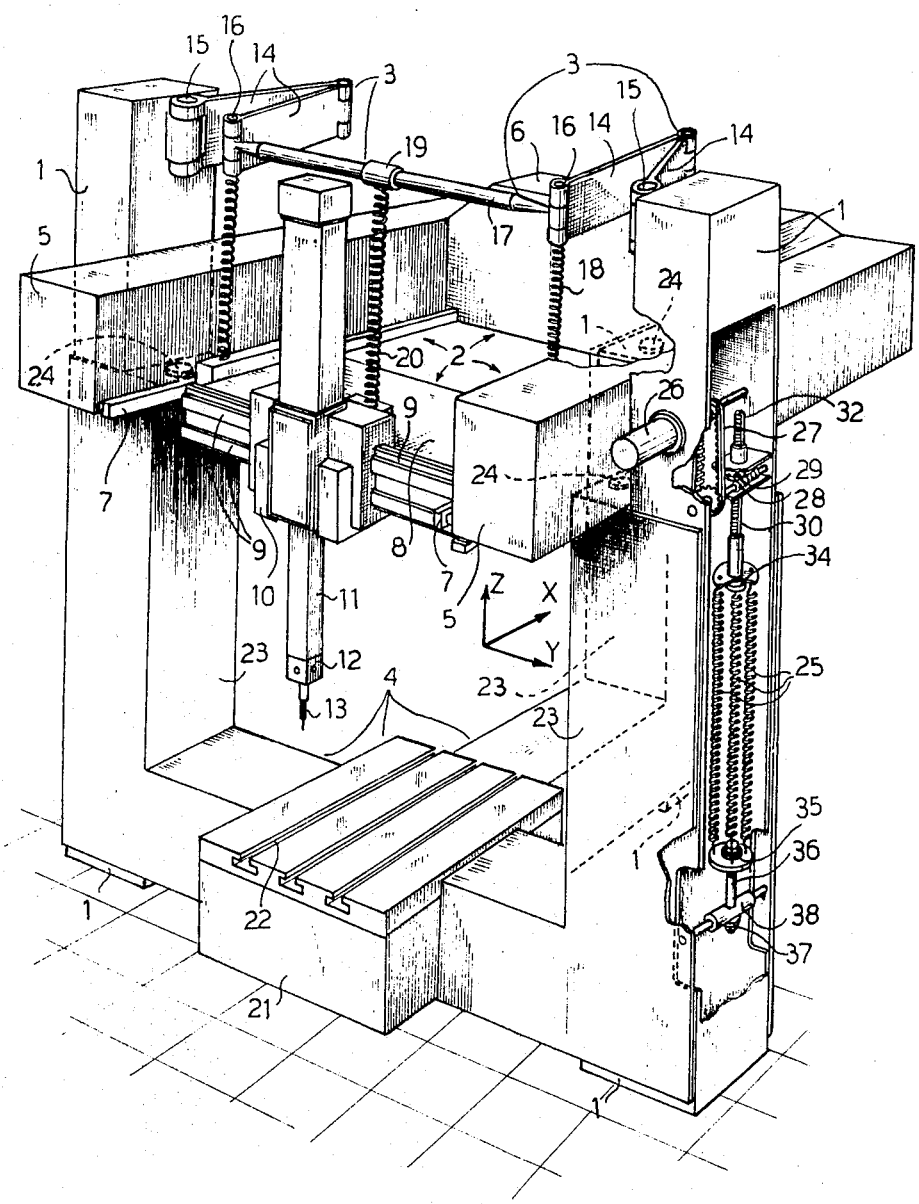
FIG. 1 is a partially sectional perspective view of a measuring and scribing machine according to the invention.
Figure 3:
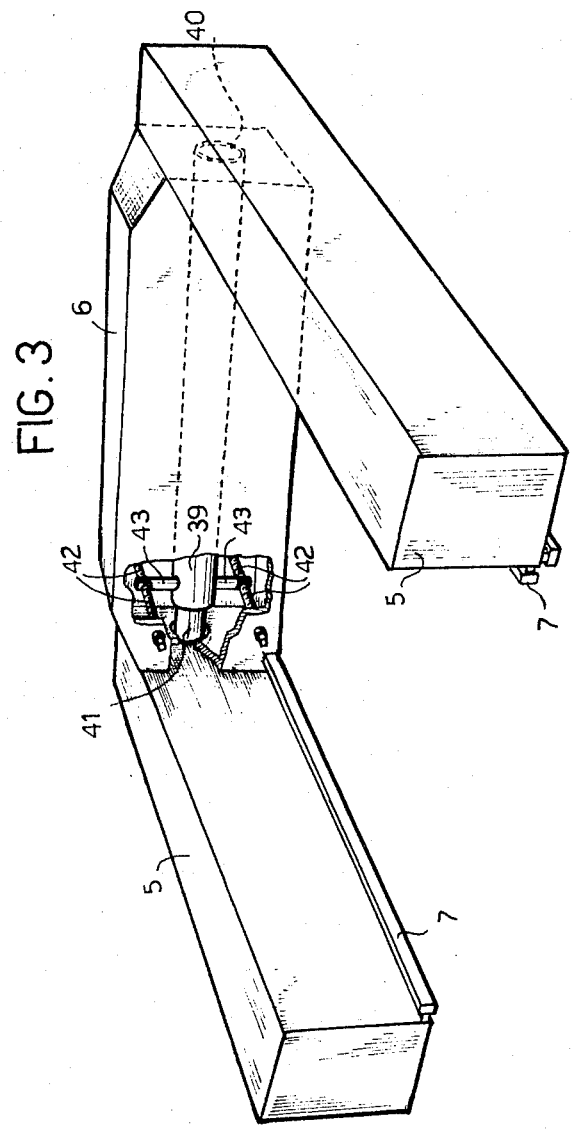
FIG. 3 is a partially sectional perspective view of a part of the working substructure of the machine shown in FIG. 1.

The machine structure is suspended from three columns 1 rigidly fixed in the ground. It is constituted of three substructures, a working substructure 2, a force substructure 3 and a supporting substructure 4.

The working substructure comprises two longitudinal beams 5 joined by a cross beam 6 which together constitute a complex in the form of a U. On the longitudinal beams there are guides 7 for a main saddle 8 on which in its turn there are guides 9 for a central saddle 10.

Through the central saddle runs a measuring column 11 which at its lower extremity comprises a working head 12 to which may be connected various tools 13.

The main saddle 8, the central saddle 10 and the measuring column 11 are driven by three servomotors adapted to move them along three coordinate axes, X, Y, Z respectively, so allowing the working head 12 to be positioned in any point within the space defined by the three strokes of the machine.

The force substructure comprises two assemblies of two articulated arms 14, each of which is connected at one extremity to the summit of one of the columns 1 by means of pivots 15, and at its other extremity to a bar 17 by means of pivots 16. At the pivots 16 the assemblies of articulated arms 14 are connected by way of traction springs 18 to the main saddle 8. On the bar 17 slides a bearing 19 of the type employing pressurised air from an external source, and which is connected to the central saddle 10 by way of a traction spring 20. The pivots of all the articulations are designed in such a manner as to reduce friction to a minimum, so that the saddles are entrained during their movement behind the force substructure with minimum force.

The supporting substructure comprises a baseplate 21 on which there is a worktable 22 for the pieces to be measured or scribed. This baseplate is connected rigidly to three L elements 23 which at the summit of their vertical branch comprise three rigid supports 24 for the working substructure 2. The supports are designed in such a manner that the working substructure is supported isostatically, not only in the vertical but also in the transverse direction.

The supporting substructure is suspended by means of resilient supports or springs 25 from the columns 1. The springs 25 are necessarily of very low rigidity as they have to filter the low frequency vibrations in the ground. Consequently, each time a workpiece is positioned on the worktable 22, the machine assumes one of its configurations, as the reactions on the resilient supports 25 vary in accordance with the weight and position of the workpiece.

A device comprising a motor 26, a cogged belt 27, a worm 28 and a helical gear 29 enables motion to be transmitted to a screw 30, the thread of which engages in a female thread 31 formed inside the helical gear 29.

The screw 30 comprises a longitudinal cavity 32 in which is lodged a key 33 which prevents it from rotating, and is connected by way of a spherical joint 34 to the spring assembly 25. This assembly is connected lowerly by way of a second spherical joint 35, a rod 36, a third spherical joint 37 and a bar 38, to the L element 23.

Three devices of the type described are disposed, one for each column, and it is consequently possible to return the worktable 22 to its original position, nullifying the various extents of yield of the resilient supports 25 due to the various reactions on them, by simply operating the motors 26 which raise or lower the supports according to requirements.

Figure 2:
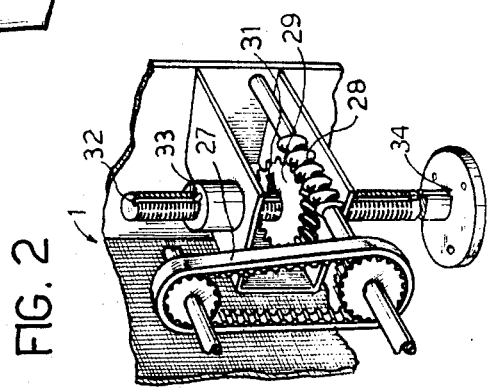
FIG. 2 is a perspective view to a larger scale of a detail of the machine shown in FIG. 1.

FIG. 2 shows by way of example a device for adjusting the vertical parallelism of the longitudinal beams 5 of the working substructure 2. This adjustment is rendered necessary because the beams 5 and 6 which comprise the working substructure have to be machined and transported separately because of their size. Moreover during final assembly it is possible to align these beams perfectly, and if at that time errors of parallelism are found they can be easily eliminated.

The adjustment device comprises a torsion bar 39 which at one extremity 40 is rigidly fixed to the cross beam 6, whereas at its other extremity 41 it is free to rotate. The bar may be placed in a state of torsion by means of screws 42 which act on pivots 43.

The torsional rigidity of the bar 39 is at least 50 times less than the torsional rigidity of the beam 6, because of which in order to subject this latter to torsion of a certain angle it is necessary to twist the bar through an angle 50 times greater. This enables precise adjustment of the torsion of the beam even for very small angles. Evidently the two longitudinal beams 5 which are rigidly connected to the cross beam 6 rotate relatively one with respect to the other about the axis of the beam 6 until the required alignment is obtained.

What we claim is:

1. A structure for measuring machines or machine tools, adapted for resting on the ground by way of three columns, comprising:
   at least one worktable adapted to support a workpiece to be machined or measured and saddles mobile with respect to said worktable, of which at least one is adapted to allow an element or holder supporting a tool or tracer point to slide;
   a supporting substructure to which said worktable is fixed;
   a working substructure on which said saddles are mobile;
   a force substructure connected by three rigid supports to said ground;
   said supporting substructure being connected by three resilient supports to said ground, said working substructure resting by means of three further rigid supports on said supporting substructure and said saddles being resiliently supported by said force substructure.

2. The structure of claim 1, wherein each of said three resilient supports is suspended from one of said columns, said columns being rigidly fixed to the ground.

3. The structure of claim 2, wherein said three resilient supports comprise means apt to adjust in height, at will, said resilient supports.

4. The structure of claim 3, wherein the control of said means for adjust in height said resilient support is of the automatic or manual type.

5. The structure of claim 1, wherein said resilient supports comprise at least one traction springs.

6. The structure of claim 1, wherein said working substructure is of U shape.

7. The structure of claim 6, wherein said working substructure comprises two longitudinal beams and a cross beam rigidly connected together and means for adjusting the vertical parallelism of said two longitudinal beams, comprising a torsion bar housed in said cross beam.

8. The structure of claim 1, wherein said supporting substructure comprises a base plate which supports said worktable and three L elements connected rigidly to said worktable.

9. The structure of claim 8, wherein each of said L elements has an upper part, said upper parts acting as supports for the working substructure.

10. The structure of claim 2, wherein said force substructure comprises two assemblies of two articulated arms, each of said assembly being pivoted to one of said columns and being hinged to a bar.

11. The structure of claim 10, wherein said saddles comprise a main saddle and a central saddle mobile in a direction orthogonal to the direction of movement of the former, said assemblies of two articulated arms being connected by way of two resilient elements to said main saddle.

12. The structure of claim 10, wherein said bar is connected by way of a bearing of the type employing pressurised air from an external source and a resilient element to said central saddle.

13. The structure of claim 11, wherein said resilient elements consist at least of one traction springs.

* * * * *